United States Patent [19]

Willson

[11] Patent Number: 4,571,302

[45] Date of Patent: Feb. 18, 1986

[54] RELIEVING PRESSURE DIFFERENTIAL IN VACUUM FILTER

[75] Inventor: David H. Willson, Farmington Hills, Mich.

[73] Assignee: AMSTED Industries Incorporated, Chicago, Ill.

[21] Appl. No.: 687,975

[22] Filed: Dec. 31, 1984

Related U.S. Application Data

[63] Continuation-in-part of Ser. No. 570,818, Jan. 16, 1984, abandoned.

[51] Int. Cl.⁴ .................. B01D 29/36; B01D 29/42
[52] U.S. Cl. .................. 210/791; 210/741; 210/106; 210/111; 210/117; 210/136; 210/167; 210/196; 210/387; 210/406; 210/416.1; 137/513.3
[58] Field of Search .............. 210/741, 791, 97, 106, 210/111, 117, 118, 119, 130, 136, 167, 168, 171, 196, 387, 406, 416.1, 416.5; 137/513.3, 513.5, 513.7

[56] References Cited

U.S. PATENT DOCUMENTS

| | | | |
|---|---|---|---|
| 3,215,273 | 11/1965 | Kryzer | 210/136 |
| 3,244,396 | 4/1966 | Miller | 137/513.7 |
| 3,618,772 | 11/1971 | Dietrick | 210/387 |
| 3,912,630 | 10/1975 | Reighard | 210/136 |
| 4,233,157 | 11/1980 | Miller | 210/387 |
| 4,267,060 | 5/1981 | Miller | 210/387 |
| 4,396,505 | 8/1983 | Willson | 210/97 |

FOREIGN PATENT DOCUMENTS 2098703 11/1982 United Kingdom ............ 137/513.7

Primary Examiner—Ernest G. Therkorn
Attorney, Agent, or Firm—Charles E. Bouton; Edward J. Brosius

[57] ABSTRACT

A filter system and method are provided utilizing a filter tank separated into an inlet compartment and a filtrate compartment by a filter media. Under normal filter operation, the liquid to be filtered enters the inlet compartment, is passed through the filter media and out the filtrate compartment by a pressure differential created across the filter media by a pump device. When the need arises to move the filter media as a result of the buildup of contaminents on it, it is necessary to alleviate the pressure differential across the filter media. Such pressure differential is alleviated by the controlled flowing of filtered liquid through an orifice in a closed valve into the filtrate compartment.

6 Claims, 1 Drawing Figure

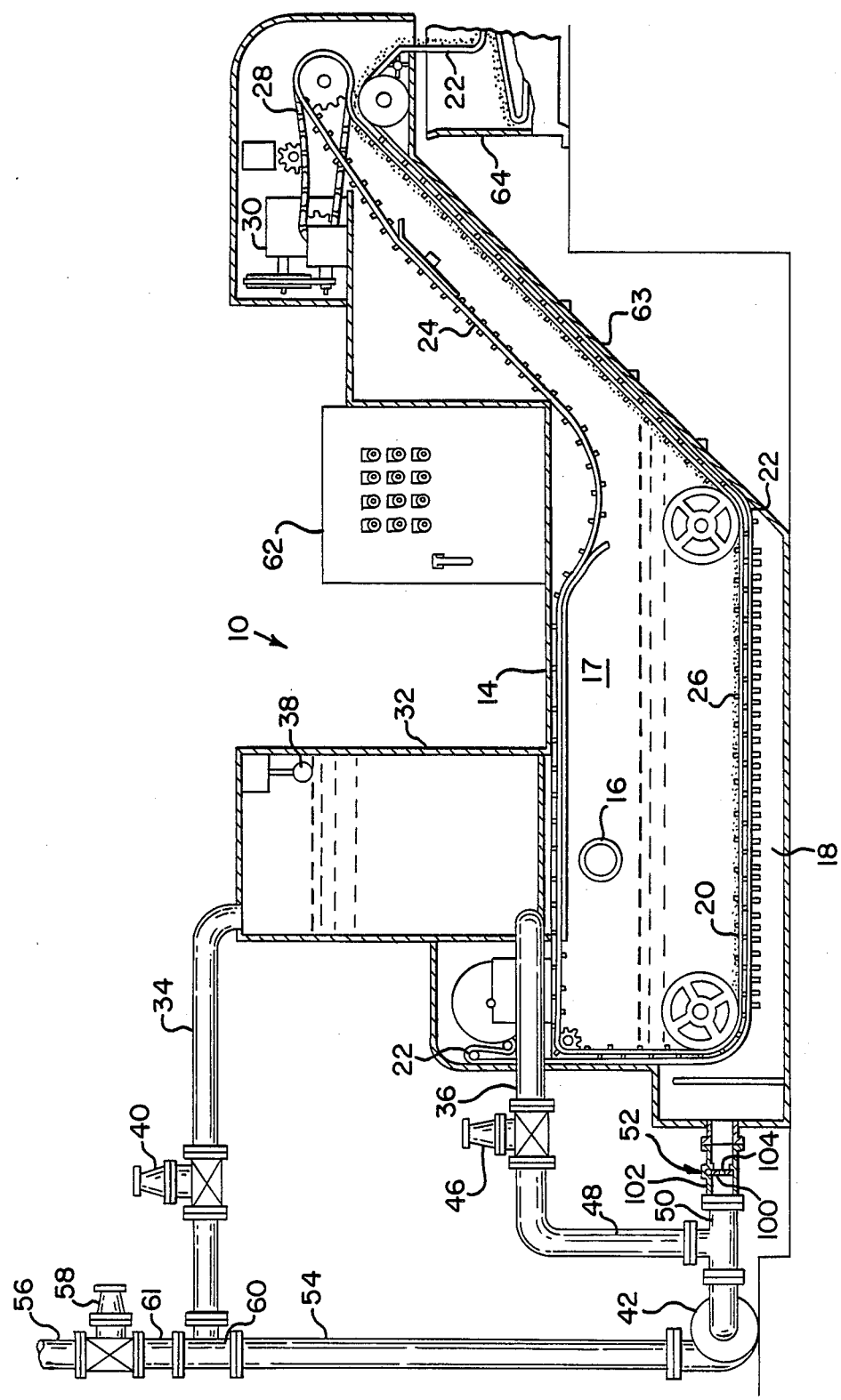

RELIEVING PRESSURE DIFFERENTIAL IN VACUUM FILTER

This application is a continuation-in-part of my prior application Ser. No. 570,818, which was filed Jan. 16, 1984, now abandoned.

BACKGROUND OF THE INVENTION

The present invention relates to industrial filters and, more particularly, to the control of the pressure differential in a vacuum type filter.

Such vacuum type filters normally have a movable filter media. One typical type filter system is shown in U.S. Pat. No. 4,396,505.

The filter apparatus normally comprises a supply of liquid to be filtered which has a discharge into the actual filter tank. Such filter tank is normally of an elongated box configuration and is divided into two sections by a movable filter grid. The liquid to be filtered is inlet into the filter tank and is passed through a filter media supported on the filter grid. The filtered liquid enters the filtrate compartment of the filter tank and is passed back into the industrial system for reuse via a pump. The suspended matter collected from the liquid being filtered is deposited on the filter media. A conveyor system is intermittently activated to transport the filter media with the suspended matter up a ramp like end wall of the filter tank for disposal. This type system is usually referred to as a vacuum type filter because the pump discharging the filtered liquid causes a pressure differential across the filter media and accordingly between the inlet portion of the filter tank and the filtrate compartment of the filter tank.

As a result of the pressure differential across the filter media, it is difficult for the conveyor system to move the filter media upon the clogging of the filter media by collected suspended matter. The pressure differential across the filter media must be relieved before the filter media can be advanced. A sensing device is utilized to determine when the pressure differential across the filter media is excessive due to the build up of contaminents on the filter media. The sensing device will open a valve discharging from a filtered liquid reservoir directly into the discharge pump and the filtrate compartment of the filter tank. The pressure differential across the filter media is thereby relieved and the filter media may be advanced by the conveyor system.

A problem exists in this known method of alleviating the pressure differential. This problem involves an excess flow from the storage tank or filtered liquid reservoir through the vacuum break valve and into the filtrate compartment. Especially when the preceding normal filter flow rate is reduced from near 100% normal flow to near 0% normal flow, and the sensing device opens the vacuum break valve, the flow from the storage tank into the filtrate compartment can be excessive. Such excessive flow can cause an abnormal upward flow from the filtrate compartment into the inlet compartment thereby displacing or actually tearing the filter media. Such an abrupt relief of the pressure differential across the filter media is a serious problem in this type of vacuum filter.

Accordingly, it is an object of the present invention to provide an improved pressure differential control in industrial vacuum type filters.

SUMMARY OF THE INVENTION

The present invention provides an improved control in alleviating the pressure differential across the filter media in a vacuum type filter. An additional controlled valve is provided at the outlet of the filtrate compartment. This valve can be an uncontrolled valve like a check valve that opens with flow in one direction and closes with flow in the other direction. Such valve includes an orifice such that upon closure of the valve, a limited one-way flow through the valve is still permitted. In the operation of the improved filter, the normal flow from the filter liquid reservoir into the inlet portion of the filter tank is as in typical vacuum type filters. A filter media is provided separating the filter tank into the inlet portion and the filtrate compartment. The check valve is provided at the outlet of the filtrate compartment and is operably connected to a pump for discharging the filtered liquid back into the industrial system for reuse. Further, this pump provides the pressure differential across the filter media. A discharge from the filtered liquid reservoir is provided and is routed through a vacuum break valve which in turn flows into the pump discharge system at a point beyond the check valve. Such vacuum break valve is normally closed under normal filter operation, whereas the check valve outletting from the filtrate compartment is normally open under normal filter operation.

A sensing device is utilized to detect the pressure differential across the filter media. When such pressure differential becomes excessive, the sensing device signals for the automatic opening of the vacuum break valve and the simultaneous closing of the normally open check valve. A swing check valve would not operate from the signal, but rather upon the change in flow direction. The filtered liquid will accordingly flow from the reservoir both directly to the pump and through the orifice of the closed check valve in a controlled limited manner so that the pressure differential across the filter media is reduced in a controlled manner. No bulging, tearing or displacement of the media will occur under such controlled relief of the pressure differential. Upon the relief of the pressure differential, the filter media may be advanced by the conveyor system thereby exposing a clean filter media between the inlet portion and the filtrate compartment of the filter tank.

In particular, the present invention provides a filter system comprising a filtered liquid reservoir, a filter tank having an inlet, a filter media sectionalizing the filter tank into an inlet compartment and a filtrate compartment, under normal filtering operations a liquid to be filtered being discharged to said inlet compartment, said liquid being filtered by passing through said filter media and entering said filtrate compartment, and a pump to draw said filtered liquid from said filtrate compartment and out of the filter system and to create a pressure differential between said inlet compartment and said filtrate compartment, a sensing device which opens a first valve between said filtered liquid reservoir and said pump and closes a check valve between said filtrate compartment and said pump when said filter media becomes clogged due to build up of filter cake thereon, said check valve having an orifice to allow controlled flow between said filtered liquid reservoir and said filtrate compartment when said check valve is closed such that upon the opening of the passage between said filtered liquid reservoir and said pump, the pressure differential between said inlet compartment and said filtrate compartment is equalized in a controlled manner thereby enabling said filter media to be moved to expose sections thereof not clogged with filter cake.

The present invention also provides a filtration method comprising the steps of providing a supply of filter liquid to a filter tank, providing a filter media in the filter tank thereby separating the filter tank into an inlet portion and a filtrate discharge portion, under normal operating conditions pumping the filtered liquid from the filtrate discharge portion of the filter tank through a normally open check valve so as to create a pressure differential between the inlet portion and the filtrate discharge portion of the filter tank, and under conditions when the filter media becomes clogged so as to cause excessive pressure differential between the inlet portion and the filtrate discharge portion of the filter tank, closing the check valve at the filtrate discharge and opening a vacuum break valve to allow pumping directly from a filtered liquid reservoir, the check valve having an orifice allowing a controlled flow when the valve is closed from the filtered liquid reservoir into the filter discharge portion of the filter tank to allow the pressure differential between the inlet portion and the filtrate discharge portion of the filter tank to be decreased in a controlled manner.

BRIEF DESCRIPTION OF THE DRAWING

In the drawing, a side elevational view of the filter system of the present invention is shown with certain parts shown in section for clarity.

DESCRIPTION OF THE PREFERRED EMBODIMENT

Referring now to the drawing, a filter apparatus is shown generally at 10. Filter apparatus 10 includes tank 14 for receiving a liquid suspension to the filter from an industrial machine (now shown) through inlet 16. Inlet 16 empties into inlet compartment 17. Also part of tank 14 is filtrate compartment 18, which is separated from inlet compartment 17 by filter media 22. Filter grid 20 is disposed to carry filter media 22 which itself is of a suitable disposable fabric or of a continuous permanent design. Conveyor system 24 comprises a pair of laterally spaced chains (not shown) having a plurality of longitudinally spaced and laterally extending flights 26 attached thereon. Flights 26 rest on filter media 22 carried by filter grid 20 so that upon longitudinal movement of the flights 26 filter media 22 is dragged in the same direction. Conveyor system 24 is advanced by sprocket and belt assembly 28 driven by motor 30.

Reservoir 32 rests on tank 14. It should be understood that reservoir 32 may be supported by other suitable structures located away from tank 14 as specified by the design requirements. Reservoir 32 includes an inlet conduit 34 at the top and a discharge conduit 36 at the bottom. A filtrate level indicator 38 is disposed inside reservoir 32 to provide a signal to an automatic actuated valve 40 in inlet conduit 34. The reservoir inlet valve 40 is normally closed in operation unless a signal is sent from indicator 38 indicating that the reservoir 32 is below a predetermined level the valve is opened until the predetermined level is again achieved. Discharge conduit 36 extends from the bottom of reservoir 32 to an automatically actuated vacuum break valve 46 and thence to a conduit 48 to a filtrate pump 42. The valve 46 is provided with manual override and is installed in a normally closed position between discharge conduit 36 and conduit 48. Valve 46 is activated and opened when a pressure differential sensor (not shown) registers a pressure differential between tank 14 and compartment 18 that exceeds a predetermined level due to the accumulation of particles deposited on filter media.

Conduit 48 connects to both filtrate compartment 18 and pump 42 through a T-shaped fitting 50. Normally open check valve 52 is installed between the filtrate compartment 18 and conduit 48 at fitting 50. The check valve 52 is of standard, commercially available design having a closure member which normally permits flow in only one direction, and is installed to permit flow in a direction from filtrate compartment 18 to the pump 42; however, according to the present invention, the check valve 52 is modified to contain an orifice or other fluid passage means which permits some flow in the reverse direction into the filtrate compartment 18 when the valve 52 is closed. In one commercial valve embodiment comprising a closure disc 100 hinged to swing in one direction within a conduit or fitting 102 the orifice 104 is provided by simply drilling one or more holes in the disc. The discharge conduit 54 of pump 42 supplies clean filtrate back to its source such as a tooling machine. Normally open valve 58 may be installed in the pump discharge conduit 54 to provide an emergency shut off. Pump discharge conduit 54 is shown to be in communication with inlet conduit 34 of reservoir 32 by a T-shaped fitting 60 forming a three way junction with clean filtrate supply conduit 61.

The size of orifice 104, or other fluid passage means, in the check valve 52 will depend upon the operating parameters of the system of apparatus, especially the size and volume of the filtrate compartment 18, the degree of negative pressure therein at the point that valve 46 is actuated and the height of liquid in the reservoir 32 above the level of liquid in tank 14, and should be sufficiently large to permit sufficient reverse flow to gradually relieve a vacuum pressure of about ten (10) inches of mercury (25.4 cm. Hg) in the filtrate compartment in six (6) to eight (8) seconds and produce a positive pressure in the filtrate compartment 18. But the orifice 104 may not be so large so to permit a reverse flow that would dislodge accumulated matter from the filter media 22.

In operation, the liquid suspension from the source such as tooling machine (not shown) is drained into tank 14 through inlet 16 in the side wall thereof. A section of clean filter media 22 collects suspended matter in the liquid suspension thereon so that clean filtrate passes through filter grid 20 into filtrate compartment 18 located below tank 14. Filter pump 42 runs continuously to provide a negative pressure relative to the fluid pressure in tank 14 by drawing filtrate from compartment 18 through check valve 52 and fitting 50 thereby inducing flow through the filter media 22. Clean filtrate is discharged in conduit 54 to recirculate back to the source 56. During this procedure, reservoir inlet valve 40 and discharge vacuum break valve 46 are normally closed except the former may open to provide clean filtrate to reservoir 32 upon demand signaled by level indicator 38.

The suspended matter accumulated on filter media 22 forms a layer of cake resulting in a reduction in flow through the filter media and an increase of pressure differential between tank 14 and compartment 18. A pressure sensor (not shown) sends a signal to control panel 62 when the pressure differential reaches a predetermined level. Control panel 62 relays a signal to activate and open the reservoir discharge valve 46 allowing clean filtrate to flow from reservoir 32 to the pump 42. Check valve 52 closes but allows some filtrate to flow from reservoir 32 in a controlled manner, to compartment 18. Flow through the orifice at valve 52 is reversed because compartment 18 is in a negative pressure relative to the liquid pressure in reservoir 32. Gravity also assists this flow. It should be understood that filtrate pump 42 runs continously during the cycle of filter media advancement. When the pressure differential is reduced a predetermined amount, control means 62 activates motor 30 of conveyor system 24 advancing chains, flights and filter media 22, carrying the suspended matters deposited on the filter media up the ramp-like end wall 63 and dispose same into a bin collector 64 located generally on floor level.

After a section of clean filter media 22 is advanced in place on filter grid 20, reservoir discharge valve 46 is signaled to close, shutting off the flow of filtrate from reservoir 32, and check valve 52 is opened. Pump 42 continues to draw filtrate from filtrate compartment 18 through check valve 52, repeating the cycle of filtration until the pressure differential is of the predetermined amount to again energize the controls as above described.

What is claimed is:

1. In a filter system for removing suspended matter from a liquid and recirculating clean filtered liquid to an industrial machine for reuse wherein the system includes a tank separated by a movable filter media into an inlet compartment and a filtrate compartment and a pump connected to withdraw filtered liquid from the filtrate compartment at a rate sufficient to create a pressure differential between the inlet and filtrate compartments, and a reservoir of filtered liquid connectable to supply filtered liquid to both said pump and said filtrate compartment upon the pressure differential reaching a selected level, the improvement comprising: a check valve located in a conduit extending between said filtrate compartment and said pump, said check valve being operative to close when the pressure differential reaches said selected level and liquid is supplied from said reservoir whereby to prevent excessive flow of said liquid into said filtrate compartment; and a fluid passage means in said check valve permitting controlled liquid flow from said reservoir to said filtrate compartment when said check valve is closed whereby to reduce said pressure differential and allow movement of the filter media.

2. The system of apparatus of claim 1 wherein the fluid passage means is an orifice in said check valve.

3. The system of apparatus of claim 1 wherein the fluid passage means is of a size to permit sufficient controlled liquid flow to said filtrate compartment so as to relieve the pressure differential within a period of six (6) to eight (8) seconds but not sufficiently large to dislodge matter accumulated on the filter media.

4. In a method for filtering suspended matter from a liquid and continuously recirculating clean filtered liquid to an industrial machine for reuse wherein liquid is passed through a movable filter media from an inlet compartment to a filtrate compartment and withdrawn from the latter and recirculated by a pump, and suspended matter is collected on the filter media until it becomes clogged and causes an excessive pressure differential between said inlet compartment and said filtrate compartment whereupon clean liquid is recirculated from a reservoir and the filter media is renewed between said inlet compartment and said filtrate compartment, the improvement comprising: blocking the movement of liquid between said filtrate compartment and pump upon reaching an excessive pressure differential by a check valve means in a conduit extending between said filtrate compartment and said pump and while supplying clean liquid to the pump from the reservoir whereby to prevent excessive flow of said clean liquid into said filtrate compartment; simultaneously flowing clean liquid from the reservoir to said filtrate compartment in a controlled manner by a passage in said check valve means to gradually reduce the pressure differential; and renewing said filter media by moving said filter media upon reducing the pressure differential by a predetermined amount.

5. The method of claim 4 wherein said blocking of liquid movement is by a check valve located between the pump and the reservoir and the filtrate compartment, and flowing of clean liquid from the reservoir to said filtrate compartment is through an orifice in said check valve.

6. The method of claim 4 wherein the said controlled manner of liquid flow from the reservoir to the filtrate compartment is at a rate sufficient to relieve the pressure differential within a period of six (6) to eight (8) seconds but not sufficiently large to dislodge matter accumulated on the filter media.

* * * * *